US009996234B2

United States Patent
Hwang et al.

(10) Patent No.: US 9,996,234 B2
(45) Date of Patent: Jun. 12, 2018

(54) ONE CLICK PHOTO ROTATION

(71) Applicant: Verizon Patent and Licensing Inc., Arlington, VA (US)

(72) Inventors: James Y. Hwang, Temple Terrace, FL (US); Helen L. Chan, Temple Terrace, FL (US); Richard E. Sodon, Temple Terrace, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 634 days.

(21) Appl. No.: 14/612,399

(22) Filed: Feb. 3, 2015

(65) Prior Publication Data

US 2016/0224219 A1 Aug. 4, 2016

(51) Int. Cl.
*G06F 3/048* (2013.01)
*G06F 3/0484* (2013.01)
*G06F 3/0482* (2013.01)
*G06F 3/0481* (2013.01)

(52) U.S. Cl.
CPC ........ *G06F 3/04845* (2013.01); *G06F 3/0482* (2013.01); *G06F 3/04815* (2013.01); *G06F 3/04817* (2013.01)

(58) Field of Classification Search
CPC ............ G06F 3/04845; G06F 3/04815; G06F 3/04817; G06F 3/0482
See application file for complete search history.

(56) References Cited

U.S. PATENT DOCUMENTS

| | | | | |
|---|---|---|---|---|
| 5,557,714 A | * | 9/1996 | Lines | G06F 3/04845 345/653 |
| 5,821,925 A | * | 10/1998 | Carey | G06T 19/00 345/419 |
| 8,334,867 B1 | * | 12/2012 | Davidson | G06F 3/04815 345/419 |
| 2003/0156200 A1 | * | 8/2003 | Romano | H04N 1/00278 348/207.99 |
| 2004/0164957 A1 | * | 8/2004 | Yamaguchi | G06F 3/04815 345/156 |
| 2005/0243196 A1 | * | 11/2005 | Belz | G06F 3/04845 348/333.11 |
| 2007/0236515 A1 | * | 10/2007 | Montague | G06F 3/04845 345/649 |
| 2009/0110317 A1 | * | 4/2009 | Alshina | H04N 19/196 382/250 |
| 2009/0184939 A1 | * | 7/2009 | Wohlstadter | G06F 3/04845 345/173 |

* cited by examiner

*Primary Examiner* — Kieu Vu
*Assistant Examiner* — Asteway T Gattew

(57) ABSTRACT

A system includes a processor, a display device, an input device and a memory with an application executable on the processor. The display device has a display frame of reference with an origin, in which the display device displays an object with the origin contained within the object. The object includes an object start point and the frame of reference includes a predetermined target point. In a user rotation mode the display device shows at least one rotation indicator, where one of multiple axes is associated to the rotation indicator. The object start point is indicated by a location on the rotation indicator. The input device selects the location on the rotation indicator and the processor in turn rotates the object to a new orientation by rotating the object about the associated axis to align the object start point with the target point.

20 Claims, 13 Drawing Sheets

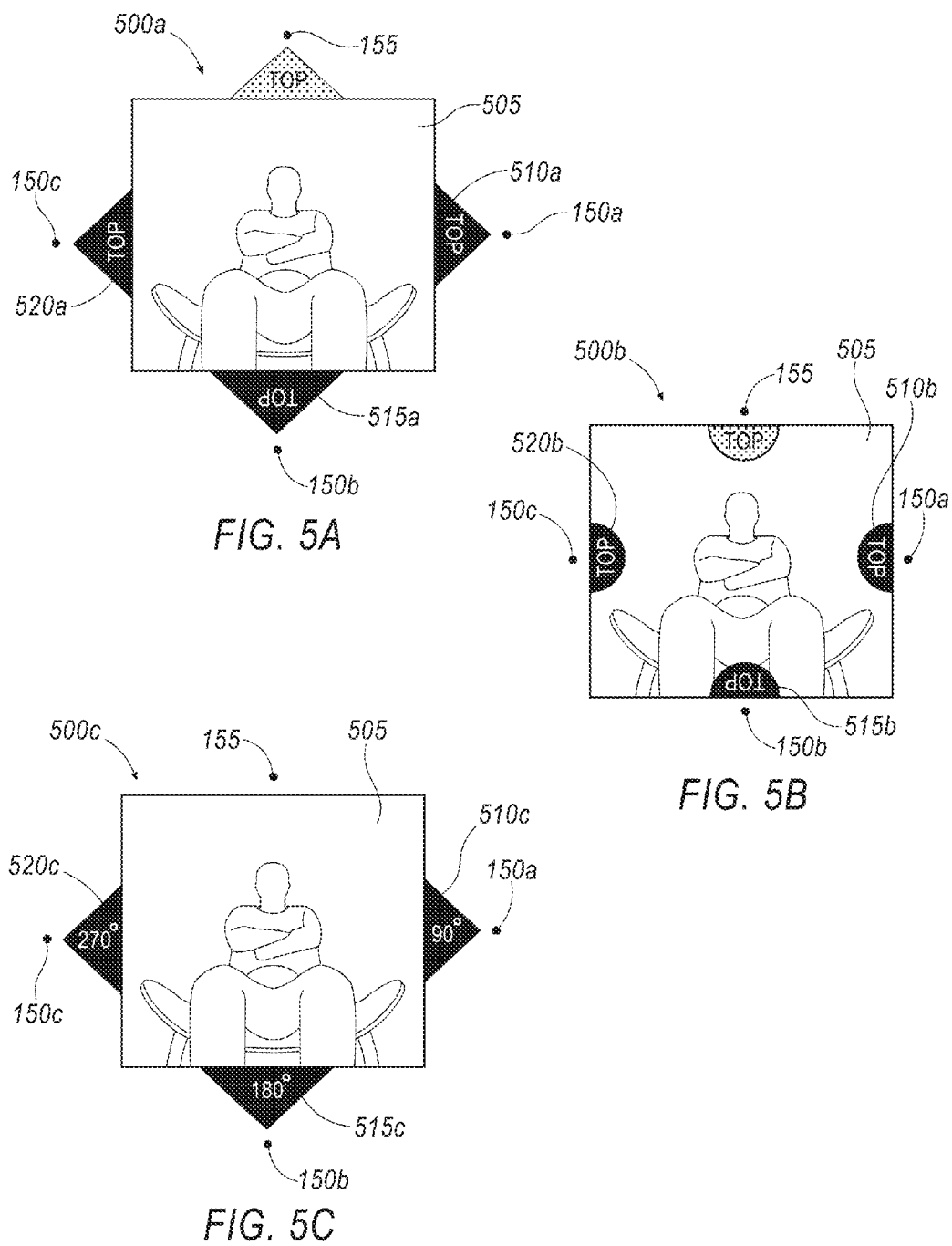

ONE CLICK PHOTO ROTATION

BACKGROUND

It is often desirable to be able to rotate an object shown on a display screen of a display device associated with a computing device. Prevalent in manipulating objects such as images in the form of pictures and photos is an option to rotate the object a fixed amount (e.g., a quarter turn of ninety degrees (90°)) about a center point of the object. To rotate the object beyond the fixed amount, additional rotations of the same object may require multiple interactions with the computing device. It is also known that such rotations require interactions that are geographically remote from the object of interest. As a result, ease of use and efficiency are both compromised.

In the case of rotating an object represented using a three-dimensional frame of reference, it is known to require a user to indicate a point on the object with a computer mouse and then to drag that user-defined point to a desired position around an axis of rotation, which varies depending on the motion imparted on the computer mouse by the user. Moreover, if the user is required to define a desired axis of rotation, specifying the desired axis of rotation may be complicated and confusing.

What is desired is a simple, intuitive and quick way for user to rotate an object associated with either a two-dimensional frame of reference or a three-dimensional frame of reference to a desired orientation.

BRIEF DESCRIPTION OF THE DRAWINGS

FIG. 5A illustrates a third exemplary set of rotation indicators.

FIG. 5B illustrates a fourth exemplary set of rotation indicators.

FIG. 5C illustrates a fifth-exemplary set of rotation indicators.

DETAILED DESCRIPTION

A system and method for electronically displaying an object (e.g., an image or photo) using either a two-dimensional frame of reference or a three-dimensional frame of reference is disclosed. A display device associated with hardware used by the system may include an object axis rotation indicator that is selectable. The object axis rotation indicator may be a geometric shape displayed on the display device and relative to the object, for example, adjacent to or within the object. Selecting the object axis rotation indicator causes the object to rotate to a new orientation. The object axis rotation indicator may indicate an object start point associated with the object. The display device may convey the new orientation with an indication of an axis of rotation and a target location that are each associated with the frame of reference of the display device and thereby fixed. When the rotation indicator is selected, the object may be rotated around the selected axis of rotation until the object start point aligns with the target point.

Thus, the selection of the axis rotation indicator "pushes" the object start point to the target point associated with the frame of reference, thereby allowing a single click to rotate the object to the desired orientation.

For example, the target point may be in an upper region of a display screen of the display device and a bottom axis rotation indicator may be located at a bottom edge of the object remote from the upper region of the display screen. If the object in the form of a photo happens to be oriented upside-down then clicking on the bottom axis rotation indicator rotates the photo to the correct orientation. Thus, an upside-down picture can be re-oriented with just one selection representing a single user interaction.

This axis rotation indicator approach not only works for objects represented within a two-dimensional ("2D") frame of reference, but also works for a three-dimensional ("3D") frame of reference. For a 3D frame of reference the system may also present two additional axis rotation indicators. A first additional axis rotation indicator may allow the object to rotate around an axis that runs vertical within the plane of the display screen, allowing with one click to rotate the left and right sides in and out of the display screen in order to get the proper front of the object in view. A second additional axis rotation indicator may allow the object to rotate around an axis that runs horizontal within the plane of the display screen, allowing the object to rotate the bottom and top in order to lay the object prone or stand up correctly. Thus, by using the various object axis rotation indicators an object can be quickly re-orientated while minimizing user interactions in an intuitive and easy to use approach to provide the desired view.

Figure 1A:
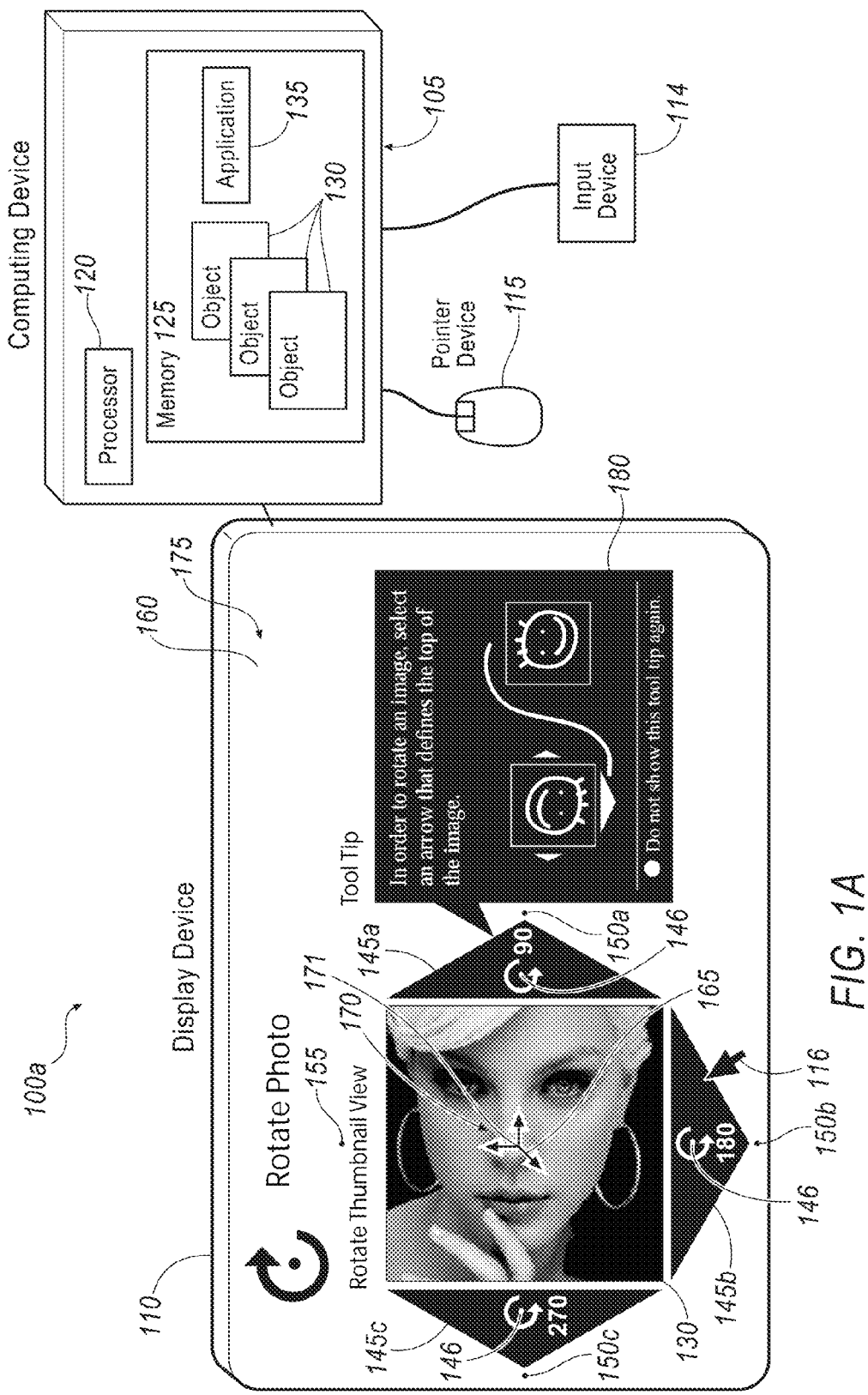
FIG. 1A illustrates an exemplary object rotation system using a display device in communication with a computing system utilizing a two-dimensional frame of reference, a first representative screen view and a first exemplary set of rotation indicators.
Figure 1B:
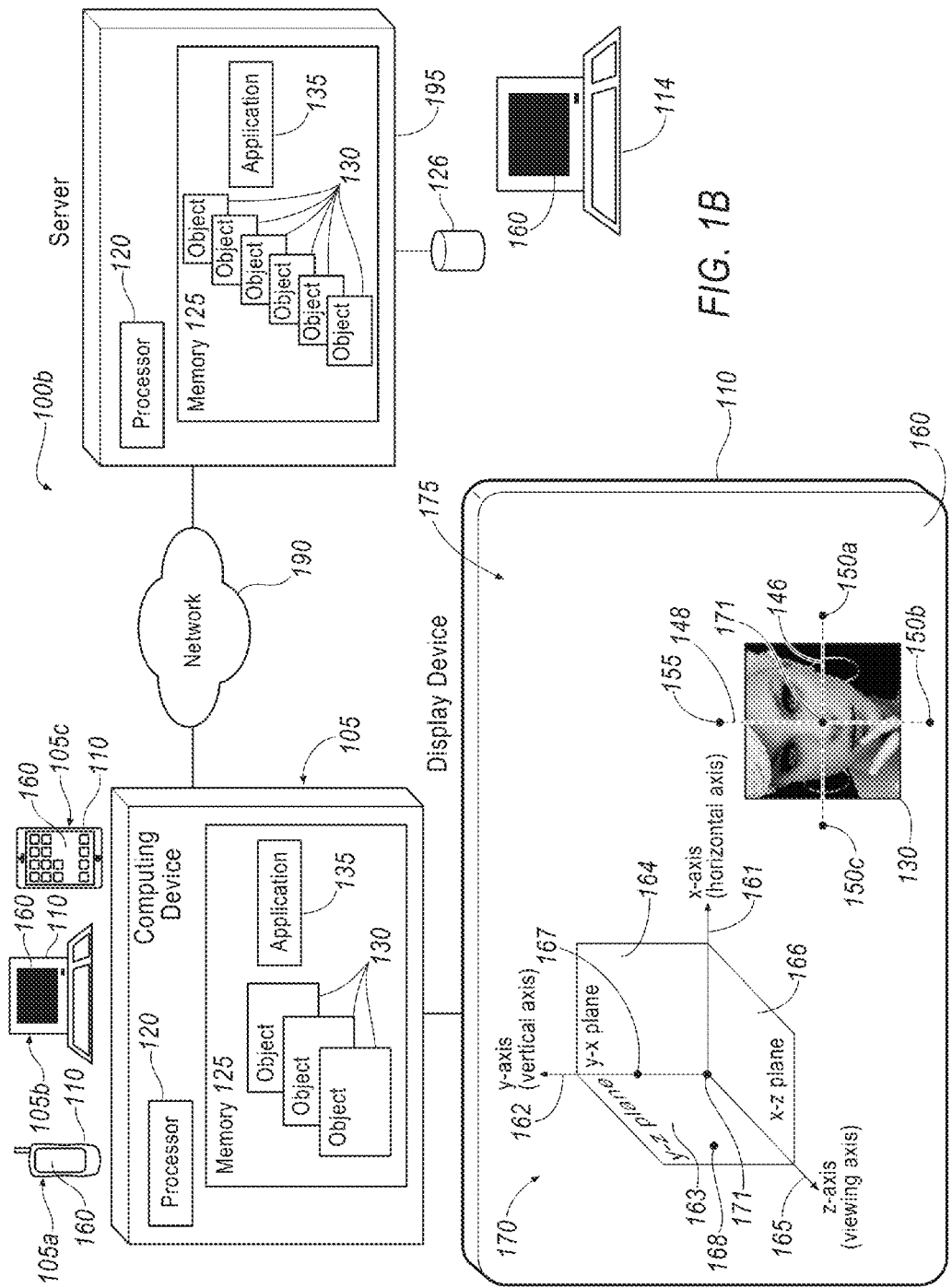
FIG. 1B illustrates a second exemplary object rotation system using a display device in communication with a computing system and a remote server.

FIGS. 1A and 1B illustrate exemplary implementations of an object rotation system 100, namely an exemplary system 100a in FIG. 1A and an exemplary system 100b in FIG. 1B. The object rotation system 100 may take many different forms and include multiple and/or alternate components and facilities. The exemplary components illustrated in FIGS. 1A and 1B are not intended to be limiting. Indeed, additional or alternative components and/or implementations may be used.

The exemplary object rotation system 100 includes a computing device 105 illustrated by way of example using a mobile device 105a, a personal computer 105b, and a tablet 105c, a display device 110 with a display screen 160 and an input device 114.

Input device 114 may include any interactive device that can provide information to the computing device 105 or act to provide a triggering event. Some examples may include a keyboard, microphone, a mouse and a touch screen. For example, a keyboard that a user interacts with by typing a key may provide text information to the computing device 105. A mouse, representing an example of a pointer device 115 and a specialized form of input device 114 may provide an indication of a location on the display device 110 (e.g., by using a "click" at a selected location represented by a pointer arrow 116 as shown in FIG. 1A). A touch mechanism also representing a pointer device 115 may be integral to the display screen 160 of the display device 110, as may be found in mobile devices 105a and 105c such as cell phones and tablet computers where the screens are sensitive to touch and a desired location may be "touched." Touching may encompass such things as a single tap on a screen, a swipe, or other action (e.g., a circular motion). A selection of a point may be represented by either a single tap on a touch screen or a mouse-over and click. Additional input devices may include different technologies such as infrared or laser scanners to provide the ability to provide an indication of a location in three-dimensions such as the technology found in an Xbox Kinect.

The display screen 160 may be a computer screen or touch surface as may be found on mobile devices 105a or 105c. Although the display screen 160 is shown as a two-dimensional ("2D") display that is flat, a 2D display may be used to represent objects that are actually in three dimensions such as through the exemplary three-phase process of tessellation, geometry and rendering. When using such an illustrative three phase process in the first phase a model may be created using linked points that are made into a number of individual polygons (tiles). In the next phase, the polygons are transformed in various ways and lighting effects are applied. In the third phase, the transformed images are rendered into one or more objects. In a different approach to illustrate 3D objects the display surface may instead provide a three-dimensional ("3D") display surface provided by other display technologies such as smart glasses, augmented reality technology or other technology capable of presenting a true depth perception 3D object to a viewer. When 3D images are made interactive so that users feel involved with a scene and the objects are experienced in a 3D environment that may be considered to be a form of augmented or virtual reality. In such instances, smart glasses or the like may project an image directly onto the retina. For example, smart glasses with a retinal display on both eyes can provide a virtual reality display. Augmented or virtual reality technology provides true depth perception by providing each eye with a different image, combining this with a head-mounted unit that uses motion sensors to update the display depending on movements of the provides the wearer with an immersive visual effect for the wearer. An example of such technology can be found in the Oculus Rift.

The computing device 105 includes a processor 120 and a memory 125. The memory 125 may be local memory on the same physical device as the processor 120. Alternatively, the memory may be physically and geographically separate from the processor. The memory 125 may hold objects 130 and a rotation application 135, which contains instructions that the processor 120 may execute to perform various tasks. The processor 120 may be configured to access the objects 130 from memory 125 and send instructions to the display device 110 to show the objects 130 on a display screen 160.

The objects 130 may be either 2D or 3D. For example, 2D objects 130 may be photos, illustrations, charts, documents, and videos. Examples of 3D objects 130 may include 3D Computer Aided Design (CAD) objects, 3D Charts, 3D stages as found in 3D models, 3D Animations, Polygon surfaces, and Non-Uniform Rational Mesh Smooth (NURBS) surfaces. The 3D objects 130 can be created in various software applications, for example CAD systems (e.g. Solid works from Dassault systems, Sketchup from Google) or drawing programs (e.g. Adobe's Photoshop in 3D mode, Maya from Autodesk or Blender from Blender from Blender Foundation).

FIG. 1B illustrates a system 100b further including a remote server 195 with one or more networks 190 connecting computing device 105 to server 195. In this configuration the server 195 may store a large repository of objects 130 in memory 125 or in an associated database 126. The objects 130 may be accessible over the network 190 and the system 100b may provide a subset of the available objects 130 to the computing device 105 to store in its own memory 120. A local database associated with computing device 105 may also comprise a portion of memory 125.

Network 190 may be any wired or wireless network 190. The network 190 may include a packet network or any other network having an infrastructure to carry communications. Exemplary networks may include one or more of a cellular network, telephone network, global area network, wide area networks (WAN), a VoIP network, an LTE network, a VoLTE (Voice over LTE) network, fiber optic network, cable network, television network, local area networks (e.g., Ethernet), wireless local area networks (e.g., radio-frequency (RF) or Wi-Fi), power-line networks, or combinations thereof. The network may further include a direct wired connection, for example, a data cable connecting two or more devices.

In general, computing systems and/or devices, such as computing devices 105a, 105b, 105c and server 195 may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices such as the computing devices 105a, 105b, 105c and server generally include computer-executable instructions such as the instructions of the rotation application 135, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices 105 or 195 (e.g., servers, personal computers, etc.), stored on computer readable media associated therewith (e.g., disks, memories, etc.). A computer program product may comprise such instructions stored on computer readable media for carrying out the functions described herein.

A screen view 175 associated with display screen 160 of display device 110 in both FIGS. 1A and 1B shows an exemplary object 130 in the form of a two-dimensional photograph. The display device 110 may include rotation indicators (e.g., soft buttons), which may be activated using an appropriate input device 114 to rotate the object 130 to a desired orientation using, for example, a single input interaction. These indicators are associated with an axis of rotation that the object is rotated around when they are selected; hence, they are called axis of rotation indicators or axis rotation indicators.

Using a combination of FIG. 1A and FIG. 1B the screen view 175 depicts an object 130 with viewing axis rotation indicators 145a, 145b and 145c. Although the illustrated example shows the rotations in units of ninety degrees (90°), which may make sense when object 130 is rectangular as shown and there is an interest in having the rotation indicators equally spaced from one another, the rotation indicators may be customizable from any preset defaults for a rectangular object or other object. Thus, in some approaches it may make sense for the computing device 105 to analyze the nature of the object geometrically and then have axis rotation indicators that are equally spaced by default. It may also be desirable to make the direction of rotation user selectable. Thus, while a clockwise direction is shown in the illustration of display screen 160 in the upper left corner of FIG. 1A, a user may select a counter-clockwise direction as well. A viewing axis 165 may be an arrow pointing out of the display screen 160 at the viewer. Thus, the display screen 160 may have a display frame of reference 170 that includes viewing axis 165, which is perpendicular to the display screen 160 extending from an origin 171. The display frame of reference 170 may be fixed with respect to display screen 160. The display device 110 may not show the display frame of reference 170. The origin 171 of the viewing axis 165 may be located in the interior of the object 130, for example at or near a center point of the object 130. A center point may be defined as reflecting the point of balance for an object 130. In the case of dimension such a point may be equidistant from an outer periphery of the object 130. In the illustrated example of an object 130 in FIGS. 1A and 1B, the object is rectangular and includes a right edge adjacent element 145a, a left edge adjacent element 145c, a top edge, and a bottom edge adjacent element 145b. Origin 171 of the axis system is contained within the interior of the object 130, which means that the origin 171 is contained within the smallest boxed 2D or 3D region that contains all parts of the object 130. While a rectangular object 130 is shown, other geometric shapes may also be used (e.g., shaped for receipt into a receiving mechanism such as a locket). If a pentagon shape is used, for example, there may be an additional axis rotation indicator 145 representing the additional edge, and the default rotation may be seventy-two degrees (72°).

The viewing axis 165 may be one of three axes making up the display frame of reference 170 with the other two axes being located in the plane of the display screen 160. For example, the viewing axis may be considered the z-axis 165 and the two axes in the display screen 160 may be the x-axis 161 and y-axis 162, for example as found in a standard 3D Cartesian axis system. The x-axis 161 may be aligned horizontally with the display surface 110, for example from the perspective of a viewer, and may also be called the horizontal axis. The y-axis 161 may be aligned vertically in the display surface 110, for example from the perspective of a viewer, and also be called the vertical axis. The display frame of reference 170 may have a y-x plane 164 that contains the y-axis 162 and the z-axis 165, a y-z plane 163 containing the x-axis 161 and the y-axis 162, and an x-z plane 166 containing the x-axis 161 and the z-axis 165. The display frame of reference 170 may also have a predefined target point 167, which may lay on the positive y-axis 162 and is useful for the vertical axis rotation indicators used x-axis and z-axis, as described below. Predefined target point 168 may be useful for the y-axis rotation indicators, as described below.

The object 130 is an example of a particular object from the set of available objects 130. As illustrated by way of example in FIG. 1A and FIG. 1B object 130 is a 2D equiangular (e.g., rectangular) photograph that includes a center point that may also define or coincide with the origin 171 and is located at the middle of the rectangle. The illustrated object 130 further includes an outer periphery defined by a top edge, a right edge, a bottom edge and a left edge. A horizontal mid-line 146 runs through the origin 171 and a point half way up the left edge and right edge. A vertical mid-line 148 runs through the origin 171 and the point halfway across the top edge and the bottom edge.

As previously noted the center point of the object 130 may coincide with the origin 171 of the display frame of reference 170. Thus, the vertical mid-line 148 may coincide with the y-axis 162 and a predefined target point 155 may also lie on both the vertical mid-line 148 and the y-axis 162. The target point 155 is seen in the display frame of reference 170 as point 167 and in the screen view 175 as point 155.

The illustrated object 130 may include a right object start point 150a, a bottom object start point and a left object start point 150c. The right object start point 150a may be located on the horizontal mid-line 146 to the right of the center point shown as origin 171 (e.g., on the positive x-axis). The bottom object start point 145b may be located on the vertical mid-line 148 below the origin acting as the center point (e.g., on the negative y-axis). The left object start point 145c may be located on the horizontal mid-line 146 to the left of the origin 171 (e.g., on the negative x-axis). A tooltip 180 may instruct a user about how to use the axis rotation indicators 145a, 145b and 145c to rotate the object 130.

Figure 2:
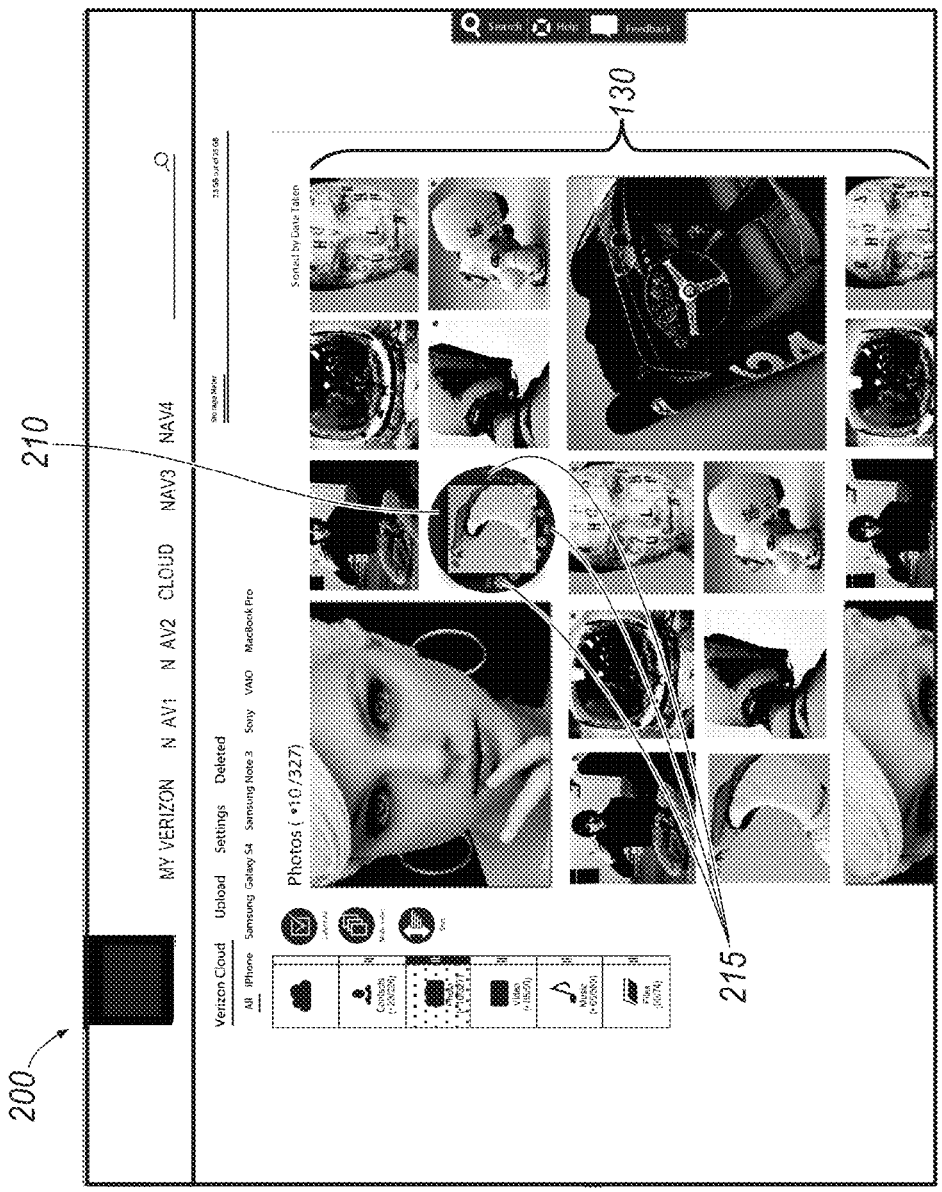
FIG. 2 illustrates a second exemplary screen view using the system.

FIG. 2 illustrates a second exemplary screen view 200 for the display screen 160. The illustration shows a possible implementation of the object rotation system 100 that displays a set of objects 130 of various sizes. In this particular illustration, a specific object 210 from the set of objects 130 has been selected and now has axis rotation indicators 215. The selection of object 210 may be different on different display devices 110.

Figures 3A, 3B:
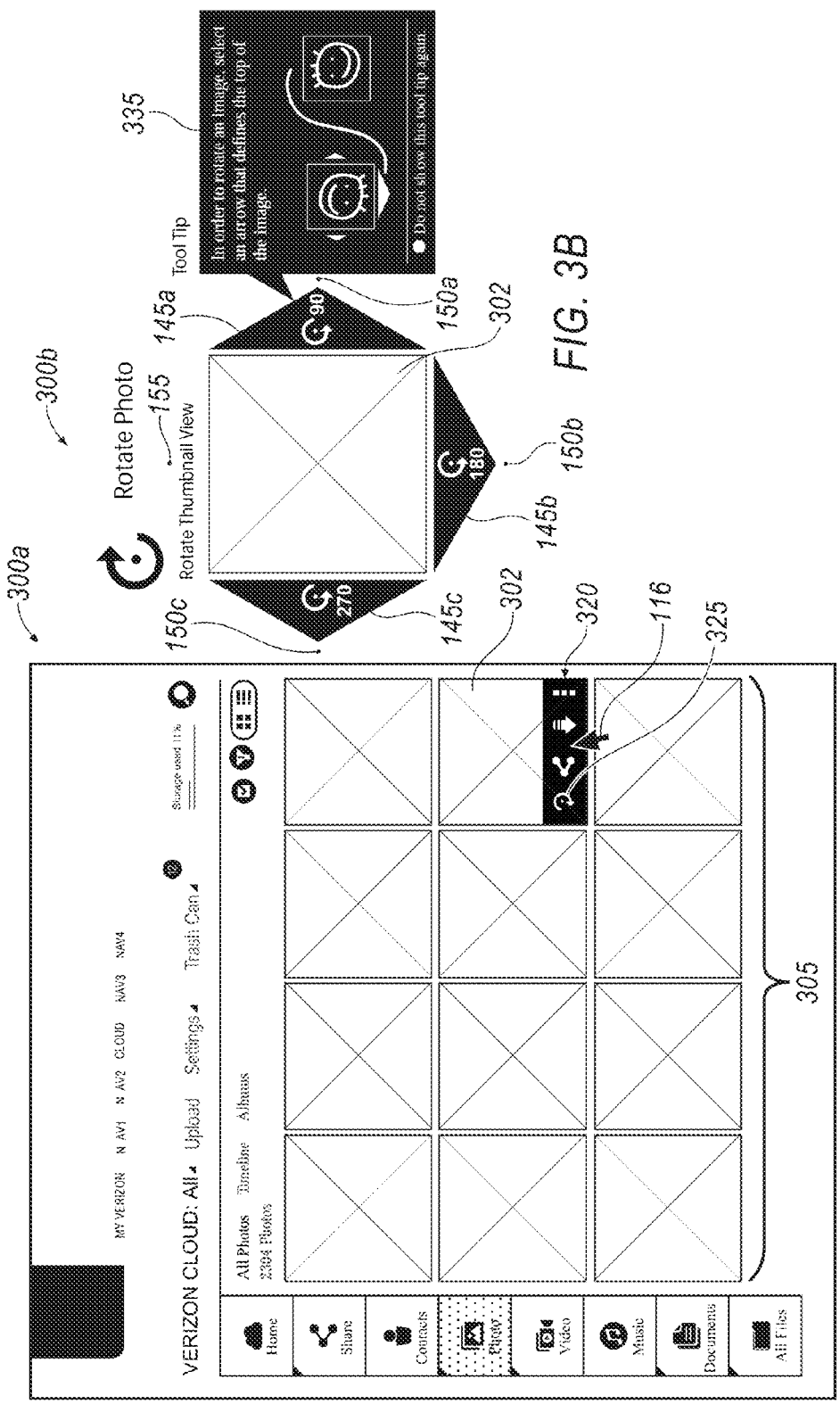
FIG. 3A illustrates a third exemplary screen view using the system.
FIG. 3B illustrates the third exemplary screen view after a user hovers over an object and a rotation mode is accessed.

FIG. 3A illustrates a third exemplary screen view 300a for display screen 160. Illustration 300a shows the object rotation system 100 displaying a set of uniformly sized display boxes 305 representing objects 302. In this example, after the pointer device 115 selects a desired object 302, the processor 120 may be configured to instruct the display to bring up a quick action overlay 320. The screen view 300a shows the screen pointer 116 as would be expected on a personal computer 105b display screen 160. The quick action overlay 320 may include a rotation icon 325 that the pointer device 115 may select. Upon selecting the rotation icon 325 the display device 110 may display the desired object 302 with axis rotation indicators as shown in FIG. 3B.

FIG. 3B is a screen view 300b of the third exemplary screen view 300a after the pointing device 115 has selected the rotation icon 325. The screen view 300a and other screens that follow identify like elements to the screen view 175 with the same element numbers. The exemplary screen view 300b shows the first set of axis rotation indicators 145a, 145b, and 145c. The screen view 300a may show the tooltip 335 that instructs a user about how to use the axis rotation indicators 145a, 145b and 145c to rotate that object edge to the top as described above.

Referring to FIG. 3B, the screen view 300b may include a right rotation indicator 145a, a bottom rotation indicator 145b and a left rotation indicator 145c. The right rotation indicator 145a may indicate the right object start point 150a by pointing to the right object start point 150a with a triangular shape of the right rotation indicator 145a. Additional information may be provided in the right rotation indicator 145a, such as a rotation indicator 146 and "90°," that conveys how the object 302 will be re-orientated (e.g., approximately a quarter turn) upon selecting the triangular shape of the right rotation indicator 145a. As previously noted, while a rotation indicator may have a default rotation depending on the geometric shape of its corresponding object, the degree of rotation and rotation direction itself may be user selectable. The bottom rotation indicator 145b may indicate the bottom object start point 150b by pointing to the bottom object start point 150b with a triangular shape of the bottom rotation indicator 145b. Additional information may be provided in the bottom rotation indicator 145b, such as the rotation icon 146 and "180°," that conveys how the object 302 will be re-orientated (e.g., approximately a half turn) upon selecting the triangular shape of the left rotation indicator 145b. The left rotation indicator 145c may indicate the left object start point 150c by pointing to the left object start point 150c with the triangular shape of the left rotation indicator 145c. Additional information may be provided in the left rotation indicator 145c, such as the rotational icon 146 and "270°," which conveys how the object 302 will be re-orientated (e.g., approximately a three-quarter turn) upon selecting the right rotation indicator 145c and the object is configured to rotate clockwise. Of course, if the opposite rotation direction were selected, the 270 degrees (270°) for a clockwise rotation becomes 90 degrees (90°) for the same object orientation going counter-clockwise. Although exemplary rotation indicators 145a, 145b, and 145c may respectively indicate 90°, 180°, and 270°, as previously discussed, any number of rotation indicators 145 may be provided, in any pre-defined rotational amount between 0° and 360°, and in any equal or varying rotational increment.

As further shown in FIG. 3B, the display screen 160 may also provide predefined rotation of object 302 without show the target reference point 155 or the object start points 150a, 150b and 150c. For example, the display screen 160 may display a message in a tooltip 335. The tooltip 335 may expressly instruct a user how to rotate the object 302. For example, an exemplary message may include "in order to rotate the image, select an arrow that defines the top of the image."

The object 302 may be rotated with, for example, a single input interaction such as a selection (e.g., one mouse click) using the rotation indicators 145a, 145b and 145c. When input from the pointer device 115 is received by the processor 120 that indicates a selection of the right rotation indicator 145a, the processor 120 may be configured by the application 135 to instruct the display device to present the image of the object 302 rotated around the viewing axis 165 to align the right object start point 150a with the target point 155. This rotation results in the object 302 being spun counterclockwise by 90°. Thus, the right edge of the object 302 is pushed to the top edge.

When the pointer device 115 indicates a selection of the bottom rotation indicator 145b then the processor 120 may be configured to rotate the object 302 around the viewing axis 165 to align the bottom object start point 150b with the target point 155 resulting in the object 302 being rotated counterclockwise by 180°. Thus, the bottom edge of the object 302 is pushed to become the top edge.

When the pointer device 115 indicates a selection of the left rotation indicator 145c then the processor 120 may be configured to rotate the object 302 around the viewing axis 165 to align the left object start point 150c with the target point 155 resulting in the object 302 rotating counterclockwise by 270°. Thus, the left edge of the object 302 is pushed to become the top edge.

The shape and location of the axis rotation indicator indicates the object start point. When the pointer device 115 indicates the selection of a location on the axis rotation indicator that location is to an associated object start point. In some cases, the object rotation system 100 may present a message to help establish the location of the object start point and predetermined target point 155, for example as provided by the tooltip 180. In the first exemplary screen, view 175 the axis rotation indicators 145a, 145b and 145c point graphically, having a triangle, to the object start points 150a, 150b and 150c respectively.

The rotation application 135 may be provided as software that when executed by the processor 120 configures the processor to provide the operations described herein. Alternatively, the rotation application 135 may be provided as hardware or firmware, or combinations of software, hardware and/or firmware. The objection rotation application may run on more than one computing device. For example, the object rotation system 100b may have part of the rotation application 135 running on the local computing device 105 that is connected to the display 110 while another part of the rotation application 135 may be running on server computing device 195, which is accessed over network 190.

Figure 4A:
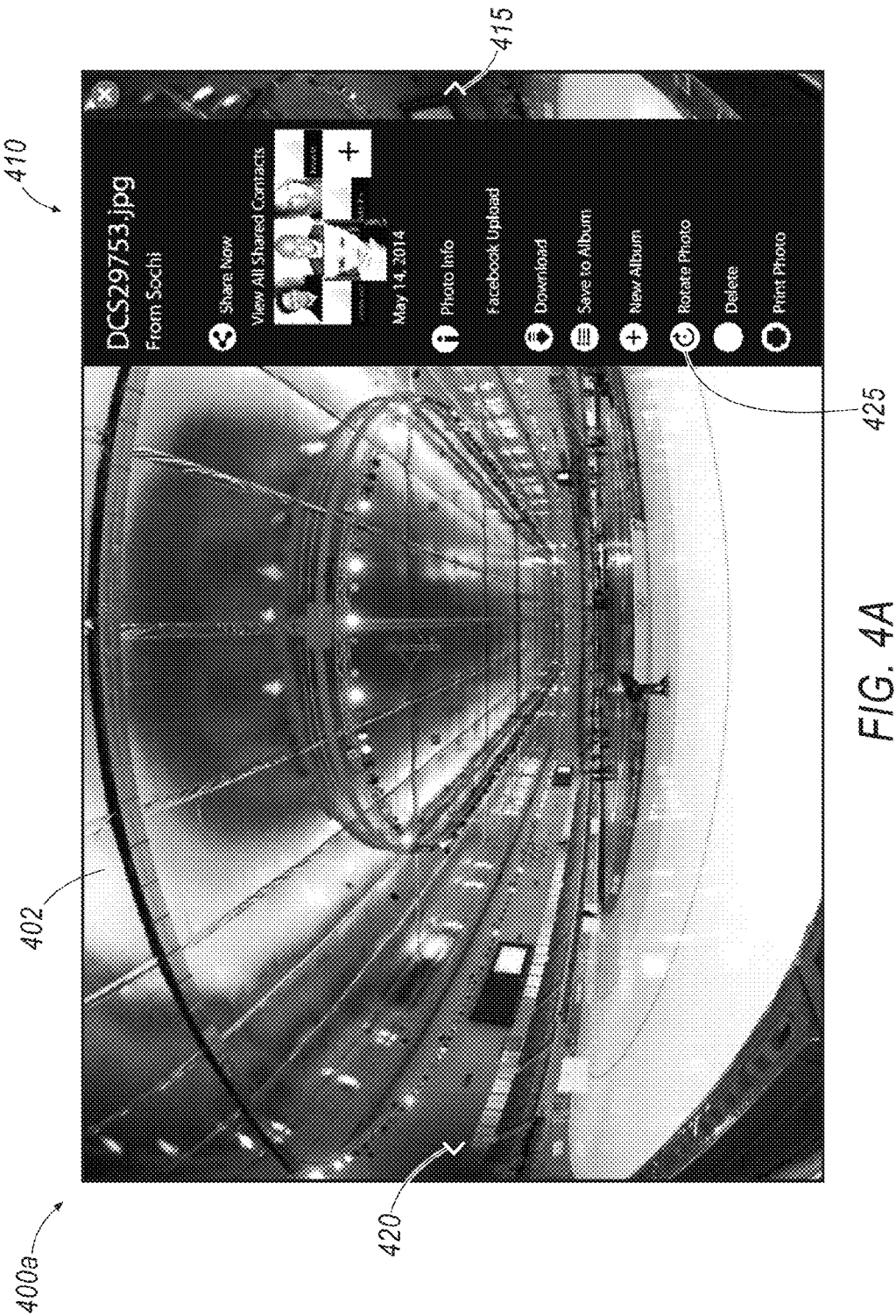
FIG. 4A illustrates a fourth exemplary screen view of the system.

FIG. 4A illustrates a fourth exemplary screen view 400a for display screen 160. Screen view 400a shows the object rotation system 100 displaying a single object 402, in this case a large photo, and a detail layer including a pop-up menu 410, a next object icon 415 and a previous object icon 420. The object rotation system 100 may invoke the detail layer in a way appropriate for the display device 110 and the pointer device 115 of the object rotation system 100 as described above. For example, in an implementation accessed on a personal computer 105b the detailed layer may be invoked when the screen pointer 116, shown in FIG. 4B, tracks over the object 402. The object rotation system 100 may monitor the pointer device screen pointer 116 (e.g., mouse movements) on computing device 105 and if idle for some amount of time, for example two seconds, then the detail layer may be removed to show the object 402 unobstructed. The pop-up menu 410 may include a rotate menu option 425. Once the rotate menu option 425 is selected then the object rotation system 100 may remove the detail layer and display the axis rotation indicators as shown in FIG. 4B.

Figure 4B:
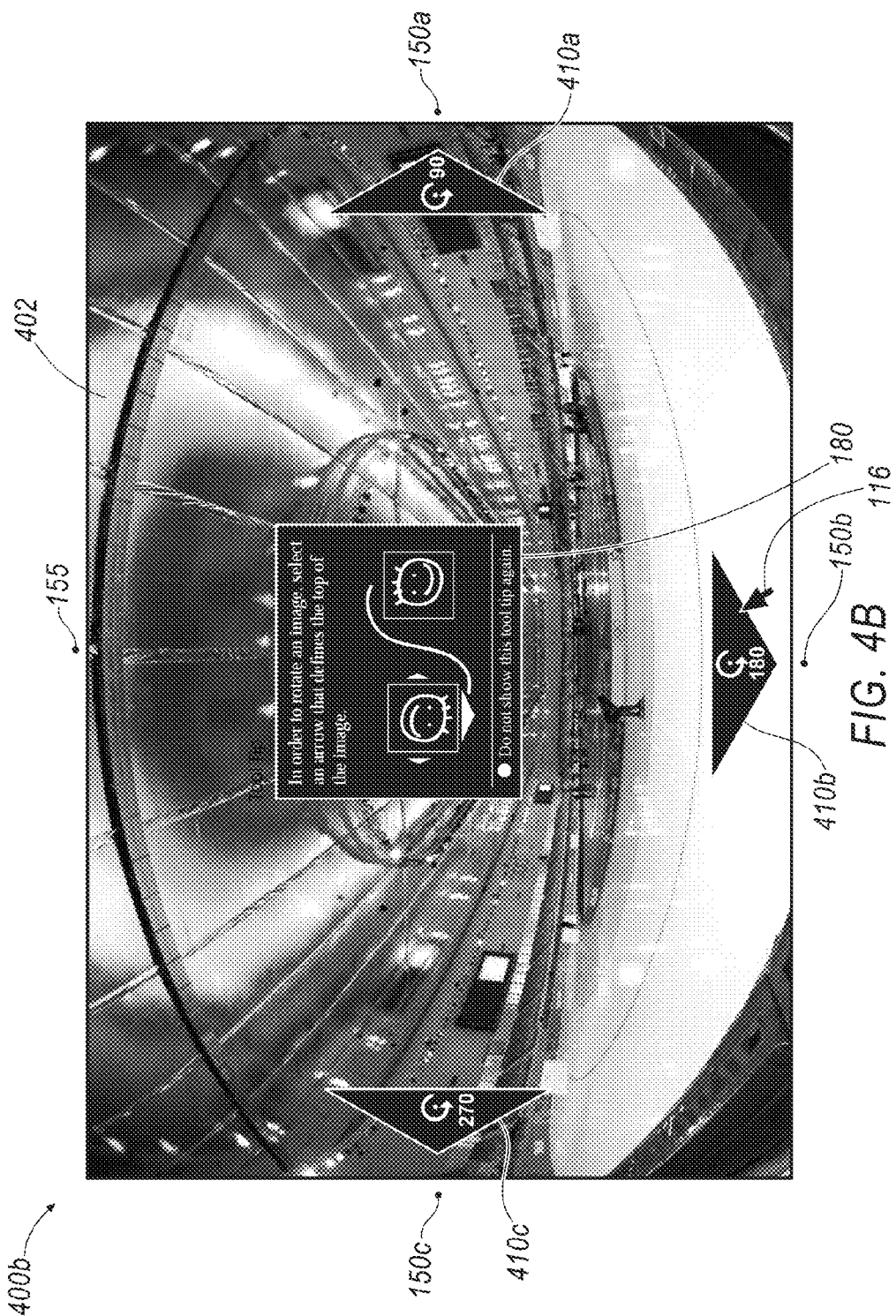
FIG. 4B illustrates the fourth exemplary screen view after a user selects a rotation menu and includes a second exemplary set of rotation indicators.

FIG. 4B illustrates a screen view 400b of the fourth exemplary screen view 400 after the selection of rotation menu 425. The illustration of screen view 400b shows the large picture object 402 and axis rotation indicators 410 and tooltip 180. The functionality of axis rotation indicators 410a, 410b, and 410c is as described above for axis rotation indicators 145a, 145b and 145c respectively. In this fourth implementation, a second exemplary set of axis rotation indicators is located on top of the object 402. The axis rotation indicators 410a, 410b and 410c indicate the object start points 150a, 150b and 150c by pointing, using a triangular shape, to the start object point 150a, 150b and 150c. The screen 400b indicates the target point 155 is located at the top by the lack of an axis rotation indicator at the top and the description in the tooltip 180 and rotation indicators having the rotation symbol and text "90°", "180°" and "270°".

FIG. 5A illustrates a screen view 500a of a third exemplary set of axis rotation indicators 510a, 515a and 520a to rotate a picture object 505. Once again, while a default orientation may be provided based on the geometry of an object, it may be desirable for a user to be able to select the degree of rotation as well as the number of rotation indicators. The axis rotation indicators 510a, 515a and 520a are triangles pointing out from the edge of the picture and say "TOP." The axis rotation indicators 510a, 515a and 520a indicate the object start points 150a, 150b and 150c with a triangular shape of the axis rotation indicator 510a, 515a, and 520a pointing to the object start points 150a, 150b and 150c respectively. The illustration 500a indicates the target point 155 is located at the top with the top triangle being a different color, for example red, and by the "TOP" wording in the axis rotation indicators 510a, 515a and 520a. The "TOP" words in the axis rotation indicators 510a, 515a and 520a clearly indicate a selection of an axis rotation indicator will rotate the picture object 505 so the associated object start point 150a, 150b and 150c (and thus the corresponding side of the picture) will align to target point 155 (i.e. the top of the display screen 160). The orientation of the text "TOP" in the triangular shape axis rotation indicators 510a, 515a and 520a is orientated to indicate how the picture object 505 will be rotated if it is selected. For example, the bottom rotation indicator 150b displays the "TOP" upside down indicating, if selected, the object rotation system 100 will take the picture object 505 that is currently displayed "upside down" and rotate the picture object 505 so that the picture object 505 is right side up. The display device 110 may not show the target point 155 or the object start points 150a, 150b and 150c. The functionality of the axis rotation indicators 510a, 515a and 520a is the same as described above for axis rotation indicators 145a, 145b and 145c respectively. The selection of any part of the axis rotation indicator 510a, 515a, and 520a will select the associated object start point 150a, 150b or 150c respectively to rotate the object 505 as discussed in detail above.

FIG. 5B illustrates a screen view 500b and is similar to the screen view 500a. The illustration 500b shows a fourth exemplary set of axis rotation indicators 510b, 515b and 520b to rotate a picture object 505. The axis rotation indicators 510b, 515b and 520b are half circles extending into the picture from the edge and say "TOP." The axis rotation indicators 510b, 515b and 520b indicate the object start points 150a, 150b and 150c respectively, with the shape of the axis rotation indicators 510b, 515b, and 520b being half circles centered on the mid-point of the edge of the picture. The rest of the features for these axis rotation indicators are as described above.

FIG. 5C illustrates a screen view 500c and is similar to the screen view 500a. The illustration 500c is a fifth exemplary set of axis rotation indicators 510c, 515c and 520c to rotate a picture object 505. The axis rotation indicators 510c, 515c and 520c are triangles as described for illustration 500a but the text in these triangles are "90°", "180°" and "270°". The degrees of rotation indicate the amount of counterclockwise rotation that the picture object 505 will undergo if one of the axis rotation indicators 510c, 515c and 520c is selected. The illustration 500c indicates the target point 155 location by a lack of an axis rotation indicator at the top of the picture object 505 and by the degrees of rotation written in the axis rotation indicators 510c, 515c and 520c. The rest of the features for screen view 500c are as described above.

Additionally, rather than having all of the axis rotation indicators being the same about an object 505, the indicators 515 for any of the exemplary illustrations in the present disclosure may themselves be different (e.g., a combination of any of the indicators shown in FIGS. 5A through 5C or any other type of axis rotation indicator). As merely one additional example, an axis rotation indicator may be a scalene triangle with the point being in the direction of the final orientation after rotation of the object 505).

Figure 5D:
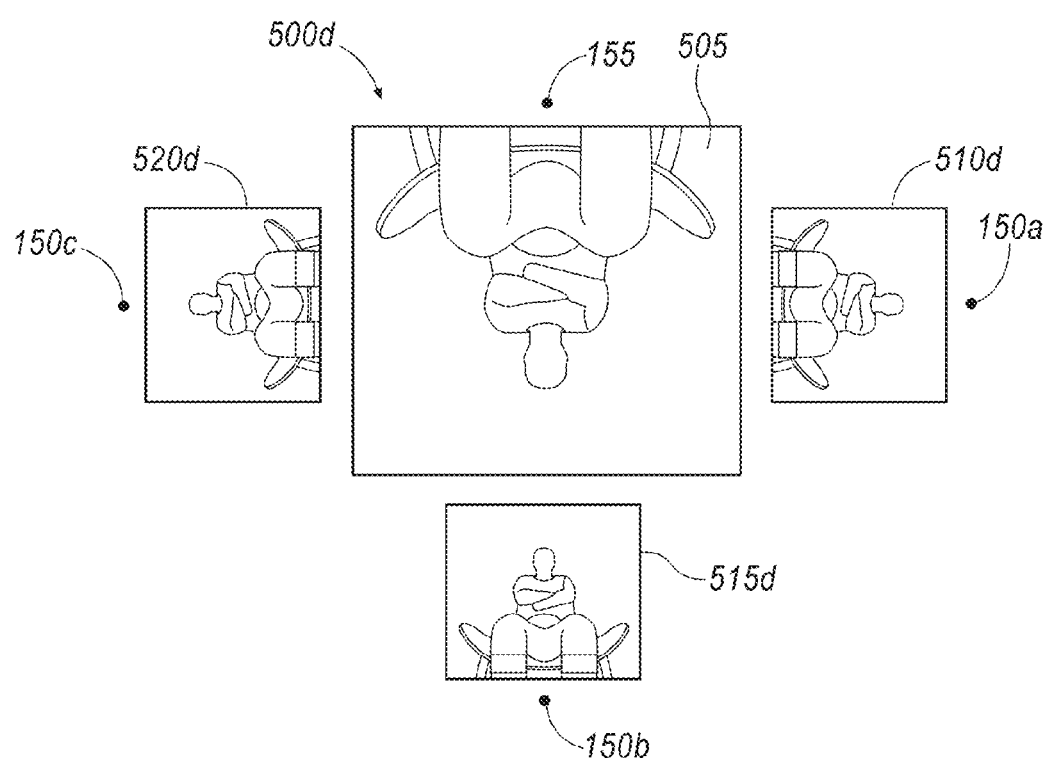
FIG. 5D illustrates a sixth-exemplary set of rotation indicators.

FIG. 5D illustrates a screen view 500d and provides a sixth-exemplary set of axis rotation indicators 510d, 515d and 520d to rotate picture object 505. The axis rotation indicators 510d, 515d and 520d present a thumbnail of the picture object 505 as the picture object will be seen when the axis rotation indicators 510d, 515d and 520d is selected. The rest of the features for screen view 500d are as described above.

Figure 5E:
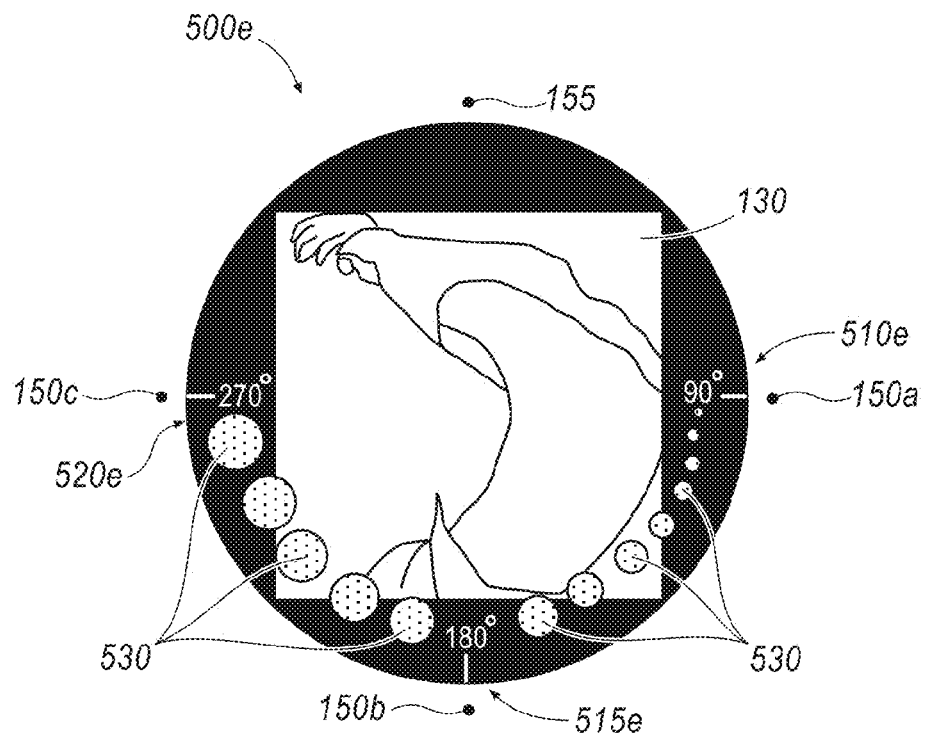
FIG. 5E illustrates a seventh-exemplary set of rotation indicators.

FIG. 5E illustrates a screen view 500e and provides a seventh-exemplary set of axis rotation indicators 510e, 515e and 520e to rotate picture object 505. The axis rotation indicators 510e, 515e and 520e present 90°, 180° and 270° text along with a dash mark to indicate the location of the object start points 150a, 150b or 150c respectively. In addition, a set of increasing sized circles 530 conveys the idea of a rotation. In an alternative implementation, the circles 530 may provide additional object start points for additional rotation options to re-orientate the picture object 505, but with the complication of having to crop the picture to force it into a standard rectangular picture presentation. The rest of the features for screen view 500e are as described above.

Figure 5F:
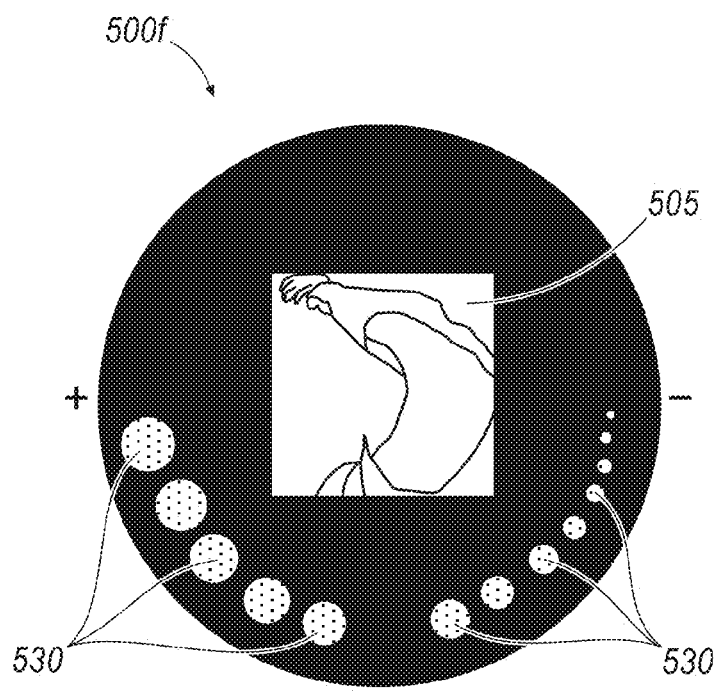
FIG. 5F illustrates an exemplary set of rotation indicators from FIG. 5E acting instead as image size indicators.

FIG. 5F shows an alternative approach to use of increasing sized circles 530 as illustrated with screen view 500f. Rather than associating circles 530 with being axis rotation indicators, in some examples indicators may represent other actions. For instance, if a user selects a larger circle 530, object 505 is enlarged or magnified, appearing closer. If a user selects a smaller circle 530, object 505 is reduced in size, thereby appearing further away. Thus, for the smallest circle, the entire object 505 may be seen while for the largest circle, only a small portion of the overall object 505 may be seen. Thus, the same indicators may be used for more than one function.

In addition, auditory feedback could be provided one selecting one of the visual axis rotation indicators. For example, the 90° rotation indicator could initiate a first predefined number of chimes (e.g., one chime); the 180° rotation indicator could initiate a second predefined number of chimes (e.g., two chimes); and the 270° rotation indicator could initiate a third predefined number of chimes (e.g., three chimes). In a further example, the 90° rotation indicator could initiate a chime a first predefined volume (e.g., a quieter chime); the 180° rotation indicator could initiate a chime at a second predefined volume (e.g., a louder chime); and the 270° rotation indicator could initiate a chime (e.g., the loudest chime).

Figure 6A:
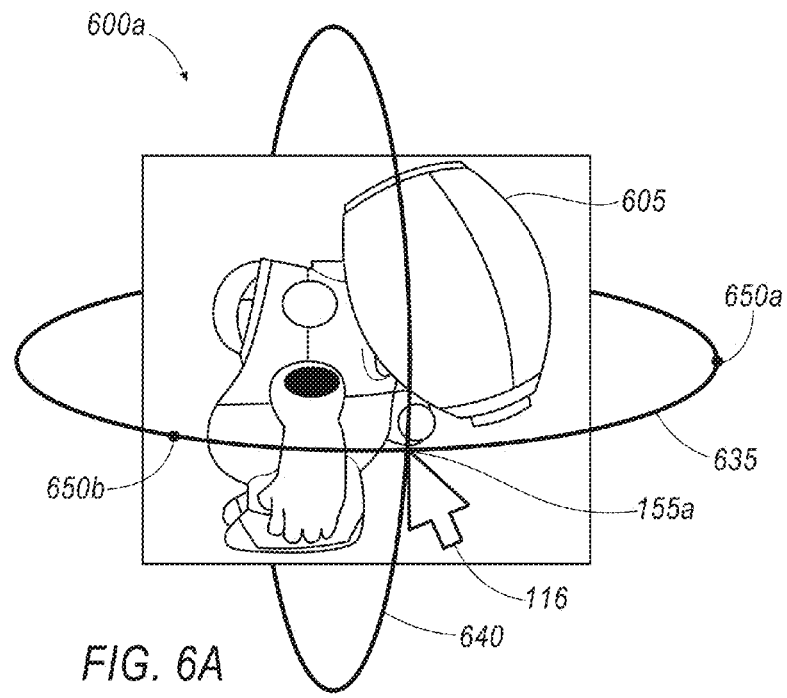
FIG. 6A illustrates an exemplary set of rotation indicators for an object represented using a three-dimensional frame of reference.

FIG. 6A illustrates a screen view 600a and provides an exemplary set of axis rotation indicators 635 and 640 for another exemplary object 605, for example, a robot. Axis rotation indicators 635 and 640 are illustrated as having an arcuate and more specifically a generally oval shape. The object 605 itself could be in three dimensions depending on the nature of display device 110 or the frame of reference 170 could be three-dimensional even for a two-dimensional representation of an object 605. For purposes of the discussion that follows, however, to promote discussion a three-dimensional object 605 is illustrated. Thus, the display device 110 may include a display frame of reference 170 (See FIG. 1B) including three axes: (1) a viewing axis, the z-axis 165, that points at a viewer, (2) a horizontal axis, x-axis 161, that is horizontal to a viewer and (3) a vertical axis, y-axis 162. The three axes may be orthogonal to each other.

A vertical axis rotation indicator 635 is associated with a vertical axis and enable the object 605 to be rotated with the left and right sides of the object 605 moving in and out of the screen display 160 with the top and bottom points being stationary as part of the axis of rotation. The vertical axis rotation indicator 635 is associated to the vertical axis for rotating the object around the vertical axis where each different selection of a location on the horizontal axis rotation indicator indicates a different start point. For example, the predetermined target point 155a may be located in the front of object 605. Selecting the vertical axis rotation indicator 635 is at location 650a would rotate the object 605 an amount of approximately 90° with the right side coming forward. Thus, the object 605 would be facing the viewer. Selecting the location 650b would rotate the backside of the robot to 605 forward in an amount of approximately 30° thereby providing a view of the robots right-backside.

In an alternate implementation, the axis rotation indicator is interactive and the orientation of the object 605 is updated to provide a preview before the axis rotation indicator is selected. For example, one implementation of such behavior may have the interactive behavior begin on a mouse-down event that occurs on the vertical axis rotation indicator 635. While the mouse button is depressed then, the object 605 may be previewed in the new orientation. For example, the preview may be useful when the user is trying to refine the orientation of the object 605 to get a particular orientation. Using point 650b as an example, while the mouse is held down and the mouse is moved upwards on the screen 160 then the object 605 would continue to rotate with the right side coming out and the left side going into the display screen 160.

In addition, or as an alternative, a pointer device 115 such as a mouse may provide feedback when a mouse button is depressed such that textual feedback could be provided. For example, information related to movement of the object such as the degrees of rotation about a particular axis could be displayed as text and continuously updated as the pointer device 115 provides updated locations while the mouse button is depressed. An implementation could have the text indicate the degrees of rotation that the object 605 will experience if the button were released. This would be helpful if a user is trying to rotate the object 605 a specific amount, for example 45°.

In addition, once the interactive mode is established then the mouse would not have to remain on the vertical axis rotation indicator, rather the closest point on the vertical axis rotation indicator 635 could be used to update the rotation of the object 605.

A horizontal axis rotation indicator 640a is associated with a horizontal axis, x-axis 161 and enables the object 605 to tumble with the top and the bottom moving in and out of the display screen and the left and right points being pivot points as part of the horizontal axis of rotation. In other words, the horizontal axis rotation indicator allows the object to rotate like food on a rotisserie. The horizontal axis rotation indicator 640 is associated with the horizontal axis for rotating the object around the horizontal axis and where each different location selected on the horizontal axis rotation indicator indicates a different object start point. As an example; the selected start point may be rotated to the target point located at the top of the display device screen.

Each axis rotation indicator may have a separate predetermined target point. A predetermined target point location may for the horizontal axis rotation indicator be a predetermined target point located on the y-axis, which can enable a selection on the horizontal axis rotating indicator to get pushed to the top or the bottom. Similarly, the predetermined target point for the visual axis rotation indicator maybe located on the y-axis, which can enable a selection on the visual axis rotation indicator to get pushed to the top or the bottom. The vertical axis rotation indicator may have the predetermined target point located on the positive z-axis. This will allow the vertical axis rotation indicator to swing to the front.

Figure 6B:
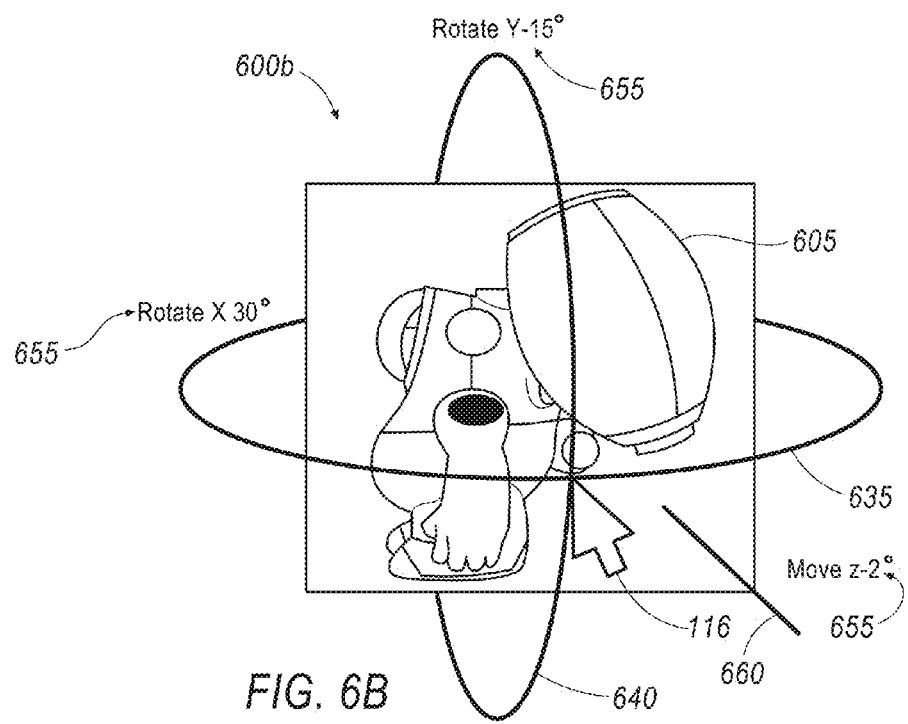
FIG. 6B illustrates a second set of rotation indicators using the three-dimensional frame of reference.

FIG. 6B illustrates a screen view 600b and provides a second set of axis rotation indicators similar to the screen view 600a. In addition to the elements of 600a, 600b also shown are text 655 that may show the amount of absolute total rotation of the object 605 from its native position in the three axes of rotations. The native position may be the position before any rotations are applied.

Also depicted is a vertical axis rotation indicator 660. The axis rotation indicator 660 illustrates an alternate way to provide rotation around the vertical axis. Clicking on the vertical axis rotation indicator 660 may rotate the object 605 around the vertical axis a set amount. For example every selection of the vertical axis rotation indicator 660 could rotate the object 605 around the vertical axis by 45°. A further illustrative implementation may have the amount of rotation dependent on where the selection occurs on the vertical axis rotation indicator 660. For example, a selection on the point farthest to right could cause a 90° clockwise rotation where the selection furthest to the left could cause in 90° counterclockwise rotation, and a selected location three-quarters of the way to the back could rotate object 605 45° counterclockwise.

The screen view 600b and other screens that follow identify like element to the screen the 600b on the display screen 160 with the same element numbers.

Figure 6C:
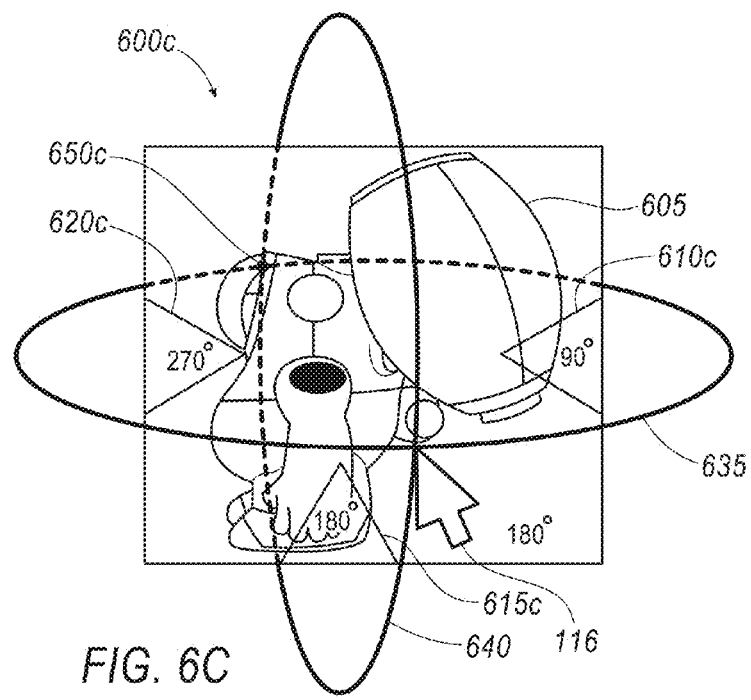
FIG. 6C illustrates a third exemplary set of rotation indicators for the three-dimensional frame of reference.

FIG. 6C illustrates a screen view 600c and provides a third exemplary set of axis rotation indicators similar to the axis rotation indicators in screen view 600a. The vertical axis rotation indicator 635 has been augmented to include a dashed line on the backside to provide access to points on the backside of the object 605. Similarly, the horizontal axis rotation indicator 640 has been extended on the backside with dashed lines enabling easy one click reorientation of the robot. For example, selecting point 650c would flip the robot upside down. In addition, vertical axis rotation indicators 610c, 615c and 620c have been added that provide the functionality described above for vertical axis rotation indicators 510c, 515c and 520c, respectively.

Figure 6D:
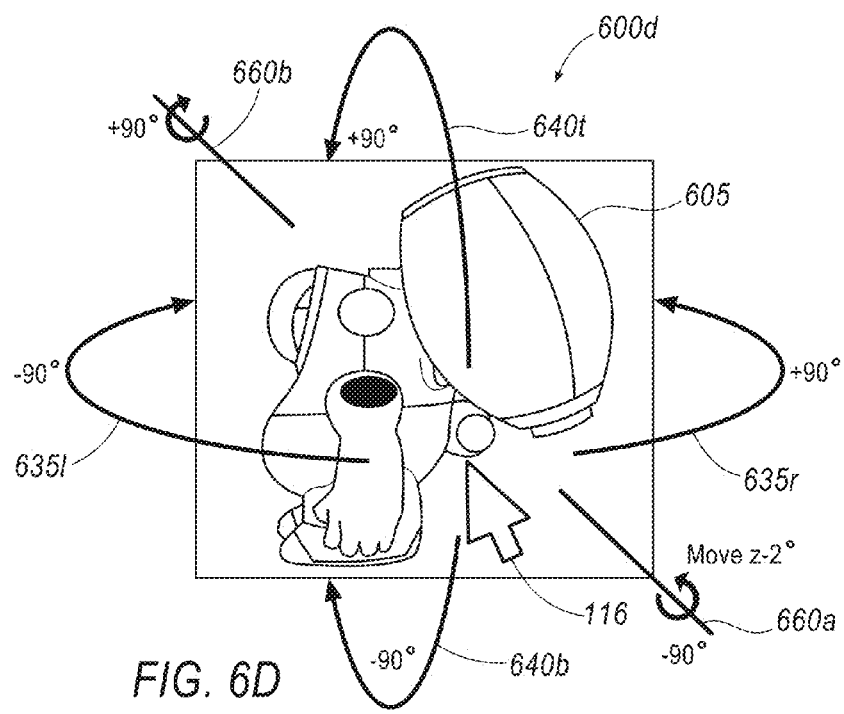
FIG. 6D illustrates a fourth exemplary set of rotation indicators for the three-dimensional frame of reference.

FIG. 6D illustrates a screen view 600d and provides a fourth exemplary set of axis rotation indicators similar to the axis rotation indicators in screen 600a. In this exemplary screen view the vertical axis rotation indicator has been split into two pieces, 635R on the right side and 635L on the left side. Selecting the right vertical axis rotation indicator 635R rotates the object 605 inward on the right side by 90°. Selecting the left vertical axis rotation indicator 635L rotates the robot object inward on the left side by 90°. Similarly, the horizontal axis rotation indicator has been split into two pieces 640T and 640B. Selecting the top horizontal axis rotation indicator 640T rotates the object 605 inward on the top by 90°. Selecting the bottom horizontal axis rotation indicator 640B rotates the object 605 inward at the bottom by 90°. The visual axis rotation indicator is provided in two parts 660A and 660B. Selecting counterclockwise visual axis rotation indicator 660A will rotate the object 605 counterclockwise 90°. Selecting the clockwise visual axis rotation indicator 660B will rotate the of object 605 clockwise 90°. This implementation provides the user with quick access to very basic and easy to understand rotations to be able to reposition their object, every 90° quickly.

Figure 6E:
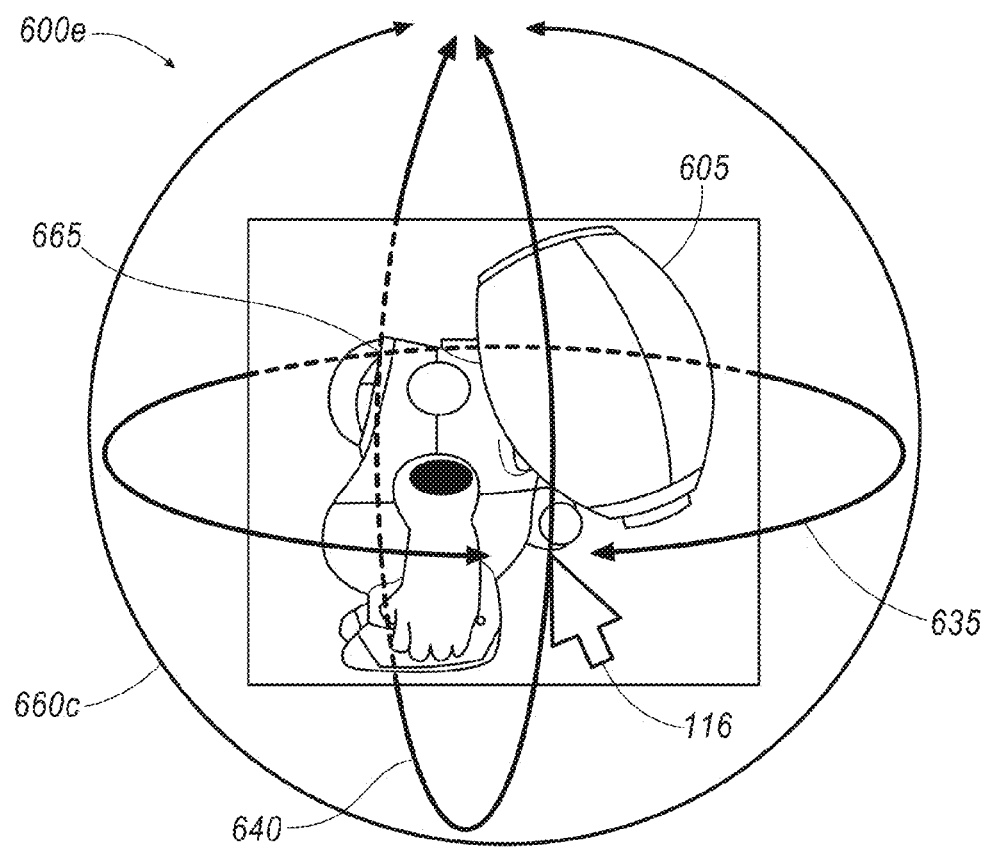
FIG. 6E illustrates a fifth exemplary set of rotation indicators for the three-dimensional frame of reference.

FIG. 6E illustrates a screen view 600e and provides a fifth exemplary set of axis rotation indicators similar to 600a. In this exemplary screen view 600e the vertical axis rotation indicator 635 has arrows and a gap pointing to where the selected location on the vertical axis rotation indicator 635 will go. Similarly, the horizontal axis rotation indicator 640 has a gap and arrows pointing to the top showing where a selected location on the horizontal axis rotation indicator 640 will rotate to when selected. Also included is a visual axis rotation indicator 660c with arrows and a gap pointing to the top that indicates where point selected on the visual axis rotation indicator 660c will go when selected. Alternatively, the visual axis rotation indicator 660c could be inscribed on the picture instead of circumscribed around the picture and the other axis rotation indicators 635 and 640. Alternatively, any of these axis rotation indicators could have just a gap or just arrows indicating where a selection on them will be pushed.

In places where axis rotation indicators overlap, for example at point 665 where the vertical axis rotation indicator 635 and the horizontal axis rotation indicator 640 intersect, then processor 120 may be configured so that the axis rotation indicator that the pointer device was hovering over, prior to selecting intersection 665, could be used to decide which axis rotation indicator to select.

Figure 7:
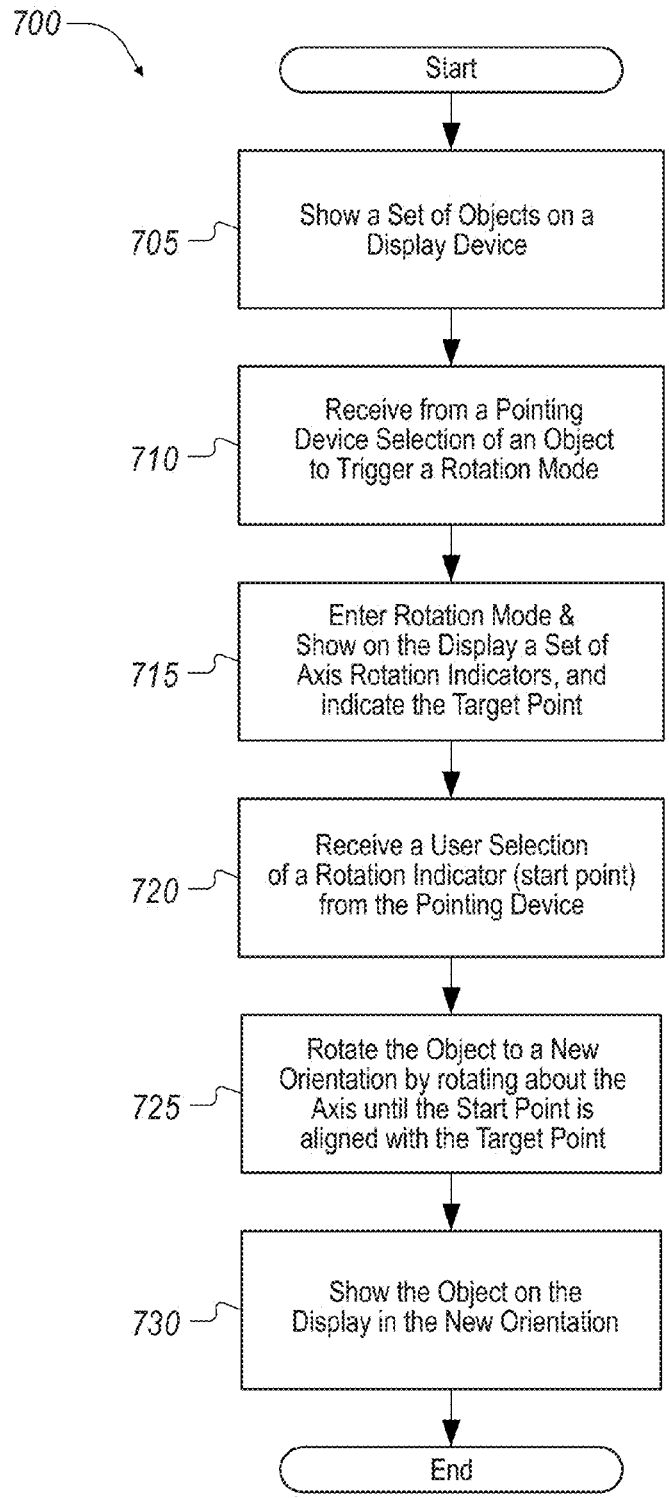
FIG. 7 illustrates a flowchart of an exemplary process of the object rotation system.

FIG. 7 illustrates a flowchart of an exemplary process that may be used by the object rotation system 100.

At block 705, the display device 110 shows a set of objects e.g., objects (130, 302, 402, 505, or 605) on the display screen 160.

At block 710, the processor 120 receives information from the pointing device 115 indicating the selection of the rotation mode for an object.

At block 715, the processor 120 directs the display device 110 to show a set of axis rotation indicators and also indicates the target point for which any subsequent selections on to which the axis rotation indicator will be rotated.

At block 720, the processor 120 receives location information from the pointing device 115 a selection on an axis rotation indicator that indicates on object start point.

At block 725, the processor 120 rotates the object around the axis associated with the selected axis rotation indicator until the object start point aligns to the target point.

At block 730, the processor 120 instructs the display device to show the object in the new orientation.

Standard ways of indicating three dimensions in two-dimensional renditions of 3D objects, such as axis, arcs indicating circles on planes slicing in and out of the two-dimensional surface can be used as axis rotation indicators.

The system 100 may display a set of objects for example in the grid, where the objects are a mix of 2D and 3D objects. The object rotation system 100 may have the 2D objects 130 be given one set of axis rotation indicators (for example right, bottom and left axis rotation indicators 145a, 145b and 145c) while the 3D objects are given a different set of axis rotation indicators (for example visual axis, vertical axis, and horizontal axis indicators such as 635, 640 and 660C).

In addition, the object rotation system 100 may allow the manipulation of 2D object 130 as a 3D object. For example, rotating a photo around a vertical axis by 180° will provide a mirror image.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A system, comprising:
a processor;
an input device electronically coupled to the processor; and
a display device electronically coupled to the processor, the display device having a display screen that includes a display frame of reference with an origin having at least one axis of rotation, and the display screen having at least one rotation indicator associated with a predetermined target point relative to the at least one axis of rotation and for displaying an object having at least one object start point, the object being positioned relative to the origin and the at least one rotation indicator;
wherein the processor is configured to:
receive information from the input device indicating a selection of at least one rotation indicator,
rotate the object, based on the selection, to a new orientation by rotating the object about the associated at least one axis of rotation to align the at least one object start point to the predetermined target point, and
instruct the display device to show the object in the new orientation;
wherein the display device displays a set of objects and the rotation mode can be triggered for one of the objects by indicating the one of the objects with the input device;
wherein the set of objects includes two-dimensional objects and three-dimensional objects;
wherein the processor is configured to have a preview mode in which the at least one rotation indicator is interactive and the input device provides a preview location on the rotation indicator that corresponds to a preview object start point before the rotation indicator is selected and the preview object start point is used by the processor to provide a preview of the object in the new orientation; and
wherein the at least one rotation indicator has an arcuate shape and encircles the at least one axis of rotation, and, when using the preview mode, the preview location on the arcuate shape is shown aligned to the predetermined target point, thereby causing the object to rotate in an opposite direction of the movement of the input device on the arcuate shape.

2. The system of claim 1, wherein:
the display frame of reference includes an x-axis defined by the display screen, a y-axis also defined by the display screen, and a z-axis that is orthogonal to the x-axis and the y-axis; and
the at least one rotation indicator is associated with the z-axis where the difference in the amount of rotation between adjacent rotation indicators that will occur when the rotation indicators are selected is a predetermined amount of rotation.

3. The system of claim 2, wherein the at least one rotation indicator includes:
an x-axis rotation indicator associated with the x-axis for rotating the object around the x-axis and where each different selection of a location on the x-axis rotation indicator indicates a different at least one object start point, and
a y-axis rotation indicator associated with the y-axis for rotating the object around the y-axis and where each different selection of a location on the y-axis rotation indicator indicates a different at least one object start point.

4. The system of claim 1, wherein:
the object has an outer periphery including a right edge, a left edge, a bottom edge, and a top edge;
the at least one object start point includes:
a right object start point that has a positive offset along an x-axis from a y-z plane that contains a y-axis and a z-axis,
a left object start point that has a negative offset along the x-axis from the y-z plane, and
a bottom object start point that has a negative offset along the y-axis from an x-z plane that contains the x-axis and the z-axis;
a first rotation indicator indicates that any selection of a location on the first rotation indicator selects the right object start point, and the right object start point and the predetermined target point are located such that the processor rotates the object a quarter turn so the right edge becomes the top edge;
a second rotation indicator indicates that any selection of a location on the second rotation indicator selects the left object start point, and the left object start point and the predetermined target point are located such that the processor rotates object a quarter turn so the left edge becomes the top edge; and
a third rotation indicator indicates that any selection of a location on the third rotation indicator selects the bottom object start point, and the bottom object start point and the predetermined target point are located such that the processor rotates the object a half turn so the bottom edge becomes the top edge.

5. The system of claim 1, wherein:
the display frame of reference includes a z-axis that extends out of a display surface of the display device, an x-axis that extends to the right of the origin and a y-axis in the plane of the display screen extends up from the origin; and
the at least one rotation indicator includes:
a z-axis rotation indicator associated with the z-axis for rotating the object about the z-axis and where each different selection of a location on the z-axis rotation indicator indicates a different at least one z-axis object start point, an x-axis rotation indicator associated with the x-axis for rotating the object around the x-axis and where each different selection of a location on the x-axis rotation indicator indicates a different at least one x-axis object start point, and a y-axis rotation indicator associated with the y-axis for rotating the object around the y-axis and where each different selection of a location on the x-axis rotation indicator indicates a different at least one y-axis object start point.

6. The system of claim 5, wherein the preview object start point is used by the processor to provide textual feedback related to movement of the object.

7. The system of claim 6, wherein at least one of the x-axis rotation indicator and the y-axis rotation indicator has the arcuate shape and encircles the corresponding at least one of the x-axis and y-axis.

8. The system of claim 1, further comprising the processor configured to trigger the rotation mode in which the processor instructs the display device to show the at least one rotation indicator.

9. The system of claim 1, wherein there are three axes of rotation for both the two-dimensional objects and the three-dimensional objects.

10. A method, comprising:

displaying an object on a display device, wherein the display device has a display screen including a fixed display frame of reference with an origin, a predetermined target point, and at least one axis extending from the origin, the object including an outer periphery and having at least one object start point, the origin disposed within the outer periphery of the object;

associating the at least one axis with at least one rotation indicator, and indicating the at least one object start point using at least one location on the rotation indicator;

providing a preview location on the rotation indicator that corresponds to a preview object start point;

using the preview object start point to provide a preview of the object in the new orientation;

receiving a selection of the at least one location on the rotation indicator via an input device;

rotating the object to a new orientation by rotating the object about the associated at least one axis to align the at least one object start point to the predetermined target point; and displaying the object by way of the display screen in the new orientation;

wherein the display device displays a set of objects and the rotation mode can be triggered for one of the objects by indicating the one of the objects with the input device;

wherein the set of objects includes two-dimensional objects and three-dimensional objects; and wherein the at least one rotation indicator has an arcuate shape and encircles the at least one axis of rotation, and, when using the preview mode, the preview location on the arcuate shape is shown aligned to the predetermined target point, thereby causing the object to rotate in an opposite direction of the movement of the input device on the arcuate shape.

11. The method of claim 10, further including:

triggering a user rotation mode based on one of a selection of an axis rotation indicator, a selection of a rotation menu item, and a selection of a rotation menu icon; and displaying the at least one rotation indicator in response to the user rotation mode being triggered.

12. The method of claim 10, wherein:

the display frame of reference includes z-axis extending out of a display surface of the display device, an x-axis extending to the right of the origin and a y-axis in the plane of the display screen extending up from the origin, each of the axes being orthogonal to the other two axes;

associating a z-axis rotation indicator with the z-axis for rotating the object about the z-axis, associating an x-axis rotation indicator with the x-axis for rotating the object around the x-axis;

associating a y-axis rotation indicator with the y-axis for rotating the object around the y-axis;

wherein each different selection of a location on one of the z-axis rotation indicator, the x-axis rotation indicator and the y-axis indicates a different at least one object start point.

13. The method of claim 12, further comprising using the preview object start point to provide textual feedback related to movement of the object.

14. The method of claim 13, wherein at least one of the x-axis rotation indicator and the y-axis rotation indicator has the arcuate shape and encircles the corresponding at least one of the x-axis and y-axis.

15. The method of claim 10, wherein there are three axes of rotation for both the two-dimensional objects and the three-dimensional objects.

16. A non-transitory computer-readable medium tangibly embodying computer-executable instructions of a software program, the software program being executable by a processor of a computing device to provide operations comprising:

displaying an object on a display device that is electronically coupled to the processor, wherein the display device has a display screen including a fixed display frame of reference with an origin, a predetermined target point, and at least one axis extending from the origin, the object including an outer periphery and having at least one object start point, the origin disposed within the outer periphery of the object;

instructing the display device, by way of the processor, to display at least one rotation indicator, associating the at least one axis with the at least one rotation indicator, and indicating the at least one object start point using at least one location on the rotation indicator;

providing a preview location on the rotation indicator that corresponds to a preview object start point;

using the preview object start point to provide a preview of the object in the new orientation;

receiving by way of an input device electronically coupled to the processor, a selection of the at least one location on the rotation indicator;

rotating, when the input device indicates a selection of the at least one location on the rotation indicator, the object to a new orientation by rotating the object about the associated at least one axis to align the at least one object start point to the predetermined target point; and instructing the display device from the processor to show the object in the new orientation;

wherein the display device displays a set of objects and the rotation mode can be triggered for one of the objects by indicating the one of the objects with the input device;

wherein the set of objects includes two-dimensional objects and three-dimensional objects; and wherein the at least one rotation indicator has an arcuate shape and encircles the at least one axis of rotation, and, when using the preview mode, the preview location on the arcuate shape is shown aligned to the predetermined target point, thereby causing the object to rotate in an opposite direction of the movement of the input device on the arcuate shape.

17. The non-transitory computer-readable medium of claim 16, further including:

the processor triggering a user rotation mode based on one of selection of an axis rotation indicator, a selection of a rotation menu item, and a selection of a rotation menu icon; and instructing the display device from the processor to show the at least one rotation indicator in response to the user rotation mode being triggered.

18. The non-transitory computer-readable medium of claim 17, wherein:

processor establishing the display frame of reference to include a z-axis extending out of a display surface of the display device, an x-axis extending to the right of the origin and a y-axis in the plane of the display screen extending up from the origin, each of the axes being orthogonal to the other two axes;

associating a z-axis rotation indicator with the z-axis for rotating the object about the z-axis, associating an x-axis rotation indicator with the x-axis for rotating the object around the x-axis;

associating a y-axis rotation indicator with the y-axis for rotating the object around the y-axis;

wherein each different selection of a location on one of the z-axis rotation indicator, the x-axis rotation indicator and the y-axis indicates a different at least one object start point.

19. The non-transitory computer-readable medium of claim 18, further comprising the processor using the preview object start point to provide textual feedback related to movement of the object.

20. The non-transitory computer-readable medium of claim 19, wherein at least one of the x-axis rotation indicator and the y-axis rotation indicator has the arcuate shape and encircles the corresponding at least one of the x-axis and y-axis.

* * * * *